United States Patent Office 3,384,674
Patented May 21, 1968

3,384,674
STABILIZATION OF NITROFORM SALTS
John A. Brown, Berkeley Heights, and Carroll L. Knapp, Jr., Cranford, N.J., assignors to Esso Research and Engineering Company, a corporation of Delaware
No Drawing. Filed Feb. 27, 1961, Ser. No. 92,089
4 Claims. (Cl. 260—644)

This invention is concerned with stabilization of a nitroform salt of an amine by addition of a small amount of an aldehyde additive. More particularly, a small amount of a relatively non-volatile aldehyde additive, such as benzaldehyde, increases the thermal stability of a nitroform salt, such as hydrazine nitroformate.

The amine nitroform salts are potent oxidizers in rocket propellant compositions. These salts are represented foremost by hydrazine nitroform, $N_2H_4 \cdot HC(NO_2)_3$, also termed amino ammonium nitroformate or hydrazinium nitroformate, and which is relatively more stable than other amine nitroform salts. Others are nitroform salts of amino guanidine, alkylene amines and polyalkylene amines.

The mechanism of the improvement of thermal stability of such amine nitroform salts by an aldehyde is not completely understood. However, studies show that the decomposition from thermal instability appears to be autocatalytic at elevated temperature, e.g. 90° C. and higher. Alkaline substances and certain metals adversely affect the stability.

Aldehydes used as additives improve the stability of a nitroform salt. Preferably the aldehydes are relatively non-volatile, i.e. have boiling points above 100° C. such as benzaldehyde and benzenoid aldehydes.

The data indicate that the decomposition rate of HNF untreated by stabilizing additive rises rapidly, as in a hyperbolic curve. The 2,4-dihydroxy benzaldehyde stabilizes best for a period up to about 25 hours but not as well as the 2% benzaldehyde at above 25 hours. An increased amount of benzaldehyde, e.g. 3%, stabilizes best over a period of 40 hours. Thus, about 1 to 5% of benzaldehyde gives effective stabilization, or a mixture of the stabilizers may be used, e.g. in small amounts of about 1 to 5% by weight of the nitroform salt.

Aldehydes having the desired stabilizing effect are susceptible to oxidation which converts them to acids. They also react with hydrazine and such compounds having an amino group. They thus may act as acidic and reducing agents. These characteristics are specific to benzenoid aldehydes, other cyclic aldehydes, e.g. furfuraldehyde, and aliphatic aldehydes that boil in the range of about 100° C. to 200° C. or higher.

The aldehyde used for stabilizing the nitroform salt may be in a crystalline solid state or in liquid state. The admixing of the aldehyde with the nitroform salt is carried out under ordinary conditions of temperature or pressure, e.g. at 0° to 50° C. The aldehyde may be added in a stage when the nitroform salt is being prepared, e.g. when hydrazine is reacted with an equal mole proportion of nitroform in methanol solution followed by precipitation with carbon tetrachloride, recovery and drying. In any event, the aldehydes indicated as stabilizing agents for hydrazinium nitroformate act effectively to reduce decomposition of the nitroformate without requiring very intensive mixing, warming or other change in conditions.

The stabilization effect of aldehyde additives is illustrated by accelerated thermal stability tests in which samples are heated under vacuum to reference test temperatures of 60° C., 75° C., and 90° C., comparatively. The decomposition rate is measured by cc. gas evolved per gram of sample tested during various periods of time at a test temperature.

Test data on stabilization of hydrazinium nitroformate (HNF) are given in the following table.

TABLE.—STABILIZATION OF HNF BY ALDEHYDES AT 90° C.

| Specimen | Decomposition, cc. Gas/gram at STP in— | | |
|---|---|---|---|
| | 20 Hrs. | 30 Hrs. | 40 Hrs. |
| Untreated HNF | 28 | 28+ | 28+ |
| HNF+3% 2,4-dihydroxybenzaldehyde | 0 | 2 | 23 |
| HNF+3% Benzaldehyde | 0 | 1 | 5 |

The sign "+" means decomposition is high above 28 cc. gas/gram of HNF, the gas being measured as under standard conditions of temperature and pressure (STP).

The aldehydic additives are thus useful for stabilizing the amine nitroform salts during storage, handling and compositing in rocket propellant systems. The nitroform salts are useful as potent oxygen oxidizers. The polymers, polyalkyleneamine nitroformates, are high energy binders. As oxidizers, the nitroform salts can be used with powdered metals, e.g. Al, Be, B, Mg and Li, with various binders, and other kinds of oxidizers, e.g. hexanitroethane, tetrakis $(NF_2)$ butane, tetrakis $(NF_2)$ furan, etc.

What is claimed is:
1. Hydrazinium nitroformate stabilized by about 1 to 5 wt. percent of an aldehyde selected from the group consisting of benzaldehyde, dihydroxybenzaldehyde, and a mixture thereof.
2. Hydrazinium nitroformate stabilized by about 1 to 5 wt. percent of benzaldehyde.
3. Hydrazinium nitroformate stabilized by about 1 to 5 wt. percent of admixed dihydroxybenzaldehyde.
4. Hydrazinium nitroformate stabilized by about 1 to 5 wt. percent of admixed benzaldehyde and dihydroxybenzaldehyde.

References Cited
UNITED STATES PATENTS
3,140,317  7/1964  Groves _____ 260—644

CARL D. QUARFORTH, *Primary Examiner.*
LEON D. ROSDOL, L. DEWAYNE RUTLEDGE, *Examiners.*
J. W. WHISLER, L. A. SEBASTIAN, *Assistant Examiners.*